United States Patent Office 3,787,426
Patented Jan. 22, 1974

3,787,426
MANUFACTURE OF 1,1-DISUBSTITUTED-4,4-BIPYRIDYLIUM SALTS
John Edward Colchester and Thomas Blundell, Runcorn, England, assignors to Imperial Chemical Industries Limited, London, England
No Drawing. Filed Feb. 24, 1971, Ser. No. 118,565
Claims priority, application Great Britain, Mar. 5, 1970, 10,679/70
Int. Cl. C07d *31/42*
U.S. Cl. 260—296 D   25 Claims

ABSTRACT OF THE DISCLOSURE

A process for the manufacture of a 1,1'-di(hydroxyalkyl)-4,4'-bipyridylium salt wherein each of the hydroxyalkyl substituents contains up to 10 carbon atoms which comprises reacting an N-hydroxyalkyl pyridinium salt with a cyanide under basic conditions and subsequently oxidizing the resulting interaction product to produce the bipyridylium salt.

---

This invention relates to the manufacture of 1,1'- disubstituted-4,4'-bipyridylium salts which are useful herbicides, and particularly to a process for the manufacture of 1,1'-di(hydroxyalkyl)-4,4'-bipyridylium salts.

In our copending patent application Ser. No. 833,709 we have described and claimed a process for the manufacture of 1,1'-disubstituted-4,4'-bipyridiylium salts wherein each of the substituents contains up to 10 carbon atoms which comprises reacting an N-substituted pyridinium salt with a cyanide under basic conditions and subsequently oxidizing the resulting interacting product.

In the copending application the invention is particularly described in respect of 1,1' - disubstituted - 4,4' - bipyridylium salts wherein the substituents are hydrocarbon groups, particularly alkyl or aryl groups, or carbamidoalkyl groups, and we have now realized that 1,1'-di(hydroxyalkyl)-4,4'-bipyridylium salts can be produced by the process.

According to the present invention we provide a process for the manufacture of a 1,1'-di(hydroxyalkyl)-4,4'-bipyridylium salt wherein each of the hydroxyalkyl substituents contains up to 10 carbon atoms which comprises reacting an N-hydroxyalkyl pyridinium salt with a cyanide under basic conditions and subsequently oxidizing the resulting interaction product. The cyanide conveniently is an alkali metal cyanide, notably sodium cyanide, although other cyanides may be used, if desired.

The reaction can be carried out simply by mixing the reagents and heating the mixture if necessary, but we prefer to carry out the reaction in a solvent for the N-hydroxyalkyl pyridinium salt. A suitable solvent is water although a wide variety of organic solvents may be employed. Examples of organic solvents which may be used are ethers and thioethers for example tetrahydrofuran, 1,2-dimethoxyethane, bis - (2 - methoxyethyl)ether, 1,4-dioxane and thiophene; organic bases, for example pyridine; amides, particularly tertiary alkylamides, for example dimethyl formamide; sulphoxides, for example dimethyl sulphoxide; sulphones, for example sulpholane; nitriles, for example acetonitrile; alcohols, for example ethanol; nitro compounds, for example nitropropane; and alkyl carbonates and sulphates, for example propylene carbonate and dimethyl sulphate. Dipolar aprotic solvents, especially dimethyl sulphoxide, are particularly suitable solvents since their use leads to high yields of the bipyridylium salts. Mixtures of solvents may be used if desired.

Another particularly suitable solvent is a mixture of water and an alcohol which is miscible with water. The alcohol in such mixtures may be in particular an aliphatic monohydroxylic alcohol, especially an alkanol, although aromatic or cycloaliphatic alcohols may be used if desired. We prefer to employ alcohols of boiling point less than 100° C. at atmospheric pressure, especially methanol or ethanol. Mixtures of two or more alcohols with water may be used if desired.

The amounts of water and alcohol in the mixture may vary within wide limits but we have found that for any particular alcohol/water mixture there exists a range of water contents in which particularly good yields of the reaction product, and hence of the bipyridylium salt, are obtained. Although the preferred range of water contents may vary slightly for different alcohols we have found that in general mixtures are preferred which contain from 5% to 65% by volume and especially from 20% to 50% by volume of water. However, it is to be understood that with some alcohols the preferred water content of the mixture is less than 20%; for example if ethanol is used as the alcohol the preferred water content of the mixture is not more than 20% by volume.

The temperature at which the reaction is carried out is not critical although in some cases it is greatly advantageous to heat the reaction mixture. In general the reaction may be carried out at a temperature of from 25° C. to 120° C., preferably from 40° C. to 100° C. Temperatures above 150° C. should in general be avoided. Usually the reaction is carried out under an inert atmosphere; reduced yields are obtained if the reaction is carried out in the presence of oxygen or air.

The reaction is carried out under basic conditions preferably, but not necessarily, in the presence of an added base. A strong base is preferred, for example an alkali metal hydroxide, although ammonium hydroxide or an organic amine may be used. In protic solvents, for example aqueous media, the addition of a base is desirable in that higher yields of the desired product and faster rates of reaction are thereby achieved. In dipolar aprotic solvents, for example anhydrous dimethyl sulphoxide the addition of a separate base may not be advantageous since the cyanide may be itself sufficiently basic under the reaction conditions. A separate base may, however, be added in such cases if desired. The product of the reaction in the presence of an added base is a 1,1'-di(hydroxyalkyl)-1,1'-dihydro-4,4'-bipyridyl.

The amount of the cyanide is not critical although we prefer to employ an excess of this reagent. Preferably at least 0.25 mole of the cyanide are used per mole of the pyridinium salt; 1 to 4 moles in the presence of an added base and in excess of 4 moles in the absence of an added base. The concentration of the pyridinium salt in cases where it is employed in the form of a solution will depend upon the solvent used, and the optimum concentration in each case can be determined by simple experiment. In general, however, concentrations of from 0.1 to 3.0 moles per litre and especially about 0.5 to 1.0 mole per litre are suitable. By way of example the optimum concentration of N-(2-hydroxyethyl)pyridinium ion in a water/ethanol (20% v./v. water) mixture is about 0.5 mole per litre.

Any N-hydroxyalkyl pyridinium salt may be converted to a bipyridylium salt by the process of our invention which has an N-substituent containing up to 10 carbon atoms, for example N-hydroxy ethyl pyridinium salts. The salt is conveniently a halide and especially a chloride salt, though the anionic species is not critical and other salts may be used, if desired. The pyridine nucleus may be substituted, for example by one or more alkyl groups in the 2, 3, 5 and 6 positions, but the 4-position should be unoccupied.

Depending upon the conditions under which it is prepared the interaction product of the pyridinium salt and the cyanide may be in the form of a solution or a slurry. Thus, for example, if the reaction is carried out in a protic solvent, notably an aqueous medium, the intermediate reaction product is in the form of a slurry of a black solid precipitate in a solution which is black or often blue in color. If, on the other hand, the reaction is carried out in a dipolar aprotic solvent, notably dimethyl sulphoxide, the intermediate reaction product is in the form of a solution, usually colored brown.

The intermediate reaction product can be oxidized directly without isolation from the mixture in which it has been prepared. However, if this product is oxidized directly the final bipyridylium salt is impure and requires to be purified. In particular the mixture so obtained contains free cyanide ions and these anions may react with the bipyridylium cation so reducing the final yield of the salt. Methods which may be employed for separating the 1,1'-di(hydroxyalkyl) bipyridylium cation from free cyanide ions are described in our said copending application.

It is usually more convenient to isolate the intermediate reaction product prior to oxidizing it so that oxidation yields a fairly pure bipyridylium salt substantially free from cyanide ions. In the case where the intermediate product is a slurry the solid can be isolated by filtration or preferably by solvent extraction. Suitable solvents for the extraction are water-immiscible ketones, for example methyl isobutyl ketone, and hydrocarbons, particularly aromatic hydrocarbons, for example toluene or monochlorobenzene. The temperature can be from 0° to 100° C.

In the case where the intermediate reaction product is a solution, as for example when it is prepared in a dipolar aprotic solvent, we have found that a useful technique for isolating it is to add water to the reaction mixture. This addition results in a slurry similar to that obtained if the initial reaction is carried out in a protic solvent. The temperature of this treatment can be for example from 0° C. to 100° C. The solid and liquid phases of the slurry can be treated as described above to recover the intermediate reaction product. This technique enables substantially pure bipyridylium salts to be obtained. The solid obtained as a result of adding water or a base to the solution of the intermediate reaction product is a 1,1'-di(hydroxyalkyl)-1,1'-dihydro-4,4'-bipyridyl.

The interaction product derived from the pyridinium salt and the cyanide is readily oxidized to the corresponding 1,1'-di(hydroxyalkyl)-4,4-bipyridylium salt by treatment with air or with an oxidizing agent which is an electron acceptor and has a redox potential in water more positive than −0.50 volt as comparted with the saturated calomel electrode. Examples of suitable oxidizing agents are ceric sulphate (in dilute sulphuric acid); metal salts, especially the halides; inorganic oxyacid anhydrides, especially sulphur dioxide; chlorine; air, preferably in conjunction with water and/or carbon dioxide and/or an acid for example acetic acid or sulphuric acid; and organic oxidizing agents for example quinones such as benzoquinone, chloranil and anthraquinone. The oxidation is advantageously carried out under acidic conditions, the pH of the reaction mixture being preferably less than 7, especially from 4 to 6. Addition of the oxidizing agent in an acidic medium is usually sufficient to achieve this result.

We have found that a particularly suitable technique for oxidizing the intermediate reaction product, which is a 1,1'-di(hydroxyalkyl)-1,1'-dihydro-4,4'-bipyridyl, comprises mixing it with a solution of a 1,1'-disubstituted-4,4'-bipyridylium salt. Such a technique is described and claimed in commonly assigned copending patent application Ser. No. 107,412 wherein details of suitable reaction conditions are given. Preferably, the 1,1'-disubstituted-4,4'-bipyridylium salt used as oxidizing agent is a 1,1'-di(hydroxyalkyl)-4,4'-bipyridylium salt wherein the hydroxyalkyl substituents are the same as those in the dihydrobipyridyl to be oxidized. As explained in copending commonly assigned application Ser. No. 107,412, the product of this oxidation is a 1,1'-disubstituted-4,4'-bipyridylium cation radical which is blue in color and which is easily converted into the corresponding 1,1'-disubstituted-4,4'-bipyridylium salt by oxidizing agents having a redox potential in water more positive than −0.50 volt as compared with the saturated calomel electrode.

The invention is illustrated but in no way limited by the following examples, wherein all parts are by weight unless otherwise stated and all percentages of reactants are by weight based on the volume of the mixture.

EXAMPLE 1

Water (25 parts) was added to a mixture of sodium cyanide (4.9 parts), sodium hydroxide (4.0 parts) and N-(2-hydroxyethyl)-pyridinium chloride under an atmosphere of nitrogen gas. The mixture was refluxed under nitrogen for one hour during which time the solution (initially colorless) became dark blue in color and very dark crystals were formed.

The crystals were removed by filtration and treated with a mixture of sulphur dioxide and water. The resulting mixture was analyzed. Colorimetric analysis indicated the presence of an N,N'-di-(2-hydroxyethyl)-bipyridylium salt in an amount (3.8 g.) corresponding to an overall reaction efficiency of 94% with respect to N-(2-hydroxyethyl)-pyridinium chloride fed.

EXAMPLE 2

Sodium cyanide (4.9 g.) and N-(2-hydroxyethyl)-pyridinium chloride (3.8 g.) were added to dimethyl sulphoxide (80 ml.) and the mixture was heated at 80° C. for 30 minutes after which time the mixture was cooled to room temperature and then filtered. The residue, 1,1'-di(2-hydroxyethyl) - 1,1' - dihydro - 4,4'-bipyridyl, was treated with a mixture of liquid sulphur dioxide (5 ml.) and water (20 ml.) and the resulting solution was analyzed spectrophotometrically. Comparison of the ultraviolet spectrum of the product at 602 m$\mu$ ($\epsilon$=13,900) with that of a standard showed that the product was a 1,1'-di(2-hydroxyethyl)-4,4'-bipyridylium salt. The reaction efficiency was 48% based on N-(2-hydroxyethyl)-pyridinium chloride fed.

The above experiment was repeated and the reaction efficiency in this case was found to be 52% based on N-(2-hydroxyethyl)-pyridinium chloride fed.

EXAMPLE 3

A solution of sodium cyanide (8%), sodium hydroxide (8%), N-(2-hydroxyethyl)-pyridinium chloride (4%) in aqueous methanol (50% water and 50% methanol) was heated under reflux conditions for 80 minutes. The mixture was then cooled to room temperature and filtered. The solid residue, 1,1'-(2-hydroxyethyl)-1,1'-dihydro-4,4'-bipyridyl, was treated with a mixture of sulphur dioxide and water and the resulting solution was analyzed as described in Example 2. The reaction efficiency was 38% based on N-(2-hydroxyethyl)-pyridinium chloride fed and the product was a 1,1'-di(2-hydroxyethyl)-4,4'-bipyridylium salt.

The above procedure was repeated except that triethylamine was employed instead of sodium hydroxide. The product was the same but the reaction efficiency was 4% based on N-(2-hydroxyethyl)-pyridinium chloride fed.

EXAMPLE 4

A mixture of sodium cyanide (5%), sodium hydroxide (2%), N-(2-hydroxyethyl)-pyridinium chloride (6%) in aqueous ethanol (20% water and 80% ethanol) was allowed to stand at room temperature for 5 hours. After this time a mixture of sulphur dioxide and water was added and the resulting solution was analyzed as described.

in Example 2. The product was a 1,1'-di(2-hydroxyethyl)-4,4'-bipyridylium salt and the reaction efficiency was 25% based on N-(2-hydroxyethyl)-pyridinium salt fed.

EXAMPLE 5

A mixture of sodium cyanide (1.9 g.), sodium hydroxide (1.6 g.), N-(6-hydroxy-n-hexyl)-pyridinium chloride (2.15 g.) and water (15 ml.) was heated under reflux conditions for 90 minutes. 1,1'-di(6-hydroxy-n-hexyl)-1,1'-dihydro-4,4'-bipyridyl was formed and the solid filtered off. The residue was oxidized by adding water and passing $Cl_2$ gas through the solution till it turned yellow. A sample of the resulting solution was treated with sodium dithionite in pH 9.2 buffer and a blue solution resulted. The ultraviolet spectrum of the product (maxima at 397, 540, 600 m$\mu$) was identical with that of a product produced by reduction with sodium dithionite at pH 9.2 of pure 1,1'-di(4 - hydroxy - n - butyl) - 4,4' - bipyridylium dichloride obtained by quaternization of 4,4'-bipyridyl.

EXAMPLES 6 TO 11

A mixture of sodium cyanide (4.9 g.), sodium hydroxide (2.5 g.), N-(2-hydroxyethyl)-pyridinium chloride (4.0 g.) and water (30 ml.) was heated under reflux conditions for 90 minutes. The resulting mixture was extracted with methyl isobutyl ketone (100 ml.) after which the aqueous layer was separated and discarded. The organic layer was divided into six portions and each portion was treated with an oxidizing agent which is identified in Table 1 below. The resulting solution in each case was analyzed and was found to contain the 1,1'-di(2-hydroxyethyl)-4,4'-bipyridylium dication.

TABLE 1

| Example | Oxidizing agent | Reaction efficiency [1] (percent) |
|---|---|---|
| 6 | Chlorine/water mixture | 100 |
| 7 | Sulphur dioxide/water mixture | 84 |
| 8 | Potassium ferricyanide | 104 |
| 9 | Ceric sulphate | 80 |
| 10 | Chloranil | 107 |
| 11 | m-Dinitrobenzene | 104 |

[1] Reaction efficiencies were calculated assuming chlorine/water gave an efficiency of 100%, and is based on N-(2-hydroxyethyl)-pyridinium chloride fed.

EXAMPLE 12

A mixture of N-(2-hydroxyethyl)-pyridinium chloride (4 g., 0.0271 m.), sodium cyanide (4.9 g., 0.1 m.), sodium hydroxide (2.5 g., 0.0625 m.) and water (30 ml.) was heated under reflux conditions for 90 minutes. The mixture was then extracted with methyl isobutyl ketone (100 ml.) and the aqueous layer was discarded. The organic layer was found by analysis to contain 1,1'-di(2-hydroxyethyl)-1,1'-dihydro-4,4'-bipyridyl of which the ultraviolet spectrum in dimethyl sulphoxide showed absorption maxima at 377 and 398 m$\mu$ and a shoulder at 356 m$\mu$.

To the organic layer containing the dihydrobipyridyl was added an aqueous solution (50 ml. water) of 1,1'-di(2 - hydroxyethyl)-4,4'-bipyridylium dichloride (6 g.). The mixture was stirred for 5 minutes and was then allowed to stand undisturbed for 5 minutes. The resulting aqueous layer, containing the 1,1'-di(2-hydroxyethyl)-4,4'- bipyridylium cation radical, was treated with chlorine gas until the blue color turned yellow and the solution was then analyzed. In the analysis the solution was treated with sodium dithionite at pH 9.2 (buffered solution) and the ultraviolet spectrum of the blue solution was determined. At $\lambda 602$, $$E^{1\%}_{1\,cm.} = 434$$

showing that the product was a 1,1'-di(2-hydroxyethyl)-4,4'-bipyridylium salt. The reaction efficiency was 40% based on N-(2-hydroxyethyl)-pyridinium chloride fed.

EXAMPLE 13

N-(2-hydroxyethyl)-pyridinium chloride, sodium cyanide and sodium hydroxide, were heated in water as described in Example 12. The resulting mixture was cooled to room temperature and filtered. The residue was washed with water (150 ml.) and then treated with an aqueous solution (50 ml. water) of 1,1'-di(2-hydroxyethyl)-4,4'-bipyridylium dichloride (6 g.). The resulting blue solution was then treated with chlorine as described in Example 14.

The product was 1,1'-di(2-hydroxyethyl)-4,4'-bipyridylium dichloride and the reaction efficiency was 69% based on N-(2-hydroxyethyl)-pyridinium chloride fed.

EXAMPLES 14 TO 19

A mixture of sodium cyanide (9.8 g.), sodium hydroxide (5 g.), N-(2-hydroxyethyl)-pyridinium chloride (8 g.) and water (60 ml.) was heated under reflux conditions for 90 minutes. The mixture was then filtered and the residue was washed with water (100 ml.) after which it was treated with an aqueous solution (50 ml. water) of 1,1'-di(2-hydroxyethyl) - 4,4' - bipyridylium dichloride (8.76 g.) to form a solution containing the 1,1'-di(2-hydroxyethyl)-4,4'-bipyridylium cation radical ion. This solution was divided into six portions and each portion was treated with an oxidizing agent as indicated in Table 2 below. In each case the final aqueous solution contained 1,1'-di(2-hydroxyethyl)-4,4'-bipyridylium dichloride.

TABLE 2

| Example | Oxidizing agent | Reaction efficiency [1] (percent) |
|---|---|---|
| 14 | Chlorine/water | 10 |
| 15 | Sulphur dioxide/water | 10 |
| 16 | Potassium ferricyanide | 8 |
| 17 | Ceric sulphate | 9 |
| 18 | Chloranil | 9 |
| 19 | m-Dinitrobenzene | 10 |

[1] Calculated on the basis of N-(2-hydroxyethyl)-pyridinium chloride fed and assuming 100% efficiency using chlorine/water.

What we claim is:

1. In a process for producing a dihydrobipyridyl derivative which is oxidizable to a 1,1'-disubstituted 4,4'-bipyridylium salt wherein each 1-substituent is an alkyl or carbamidoalkyl of up to 10 carbon atoms by reacting the corresponding 1-substituted pyridinium salt under basic conditions with soluble cyanide ions in the presence of a dipolar aprotic solvent or a dipolar aprotic solvent and an added base, said added base being selected from the group consisting of an alkali metal hydroxide, carbonate and bicarbonate and ammonium hydroxide, the improvement comprising producing the corresponding hydroxyalkyl derivative by reacting the corresponding hydroxyalkyl 1-substituted pyridinium salt in the said process.

2. A process as claimed in claim 1 wherein the cyanide is an alkali metal cyanide.

3. A process as claimed in claim 2 wherein the cyanide is sodium cyanide.

4. A process as claimed in claim 1 wherein the solvent is a polar aprotic solvent.

5. A process as claimed in claim 1 wherein the reaction is carried out at a temperature of less than 150° C.

6. A process as claimed in claim 1 wherein the temperature is from 40° C. to 100° C.

7. A process as claimed in claim 1 wherein the added base is an alkali metal hydroxide.

8. A process a claimed in claim 7 wherein the alkali metal hydroxide is sodium hydroxide.

9. A process as claimed in claim 1 wherein there is employed at least 2 moles of the cyanide per mole of the pyridinium salt.

10. A process as claimed in claim 9 wherein the reaction is carried out in the presence of a solvent for the pyridinium salt and the concentration of the pyridinium salt is from 0.1 to 2 moles per litre.

11. A process as claimed in claim 1 wherein the reaction product is oxidized under acidic conditions.

12. A process as claimed in claim 11 wherein the oxidation is carried out at a pH of from 4 to 6.

13. A process as claimed in claim 1 wherein the reaction product is oxidized by means of oxygen.

14. A process as claimed in claim 1 wherein the reaction product is oxidized by means of an oxidizing agent which is an electron acceptor and which has a redox potential in water more positive than −0.50 volt as compared with the saturated calomel electrode.

15. A process as claimed in claim 1 wherein the reaction product is contacted with a solution of a 1,1′-disubstituted-4,4′-bipyridylium salt to form a 1,1′-di(hydroxyalkyl)-4,4′-bipyridylium cation radical which is subsequently oxidized to form the 1,1′-di(hydroxyalkyl)-4,4′-bipyridylium salt.

16. A process as claimed in claim 15 wherein the aqueous solution of the bipyridylium salt is employed.

17. A process as claimed in claim 15 wherein the 1,1′-disubstituted-4,4′-bipyridylium salt is a 1,1′-di(hydroxyalkyl)-4,4′-bipyridylium salt.

18. A process as claimed in claim 1 wherein the reaction product is separated from the reaction mixture and subsequently oxidized.

19. A process as claimed in claim 1 wherein the reaction product is oxidized to the bipyridylium salt and the mixture contains free cyanide ions and the bipyridylium cation is separated from the free cyanide ions.

20. A process as claimed in claim 1 wherein the N-hydroxyalkyl pyridinium salt is a pyridinium salt wherein the alkyl group contains from 1 to 6 carbon atoms.

21. A process as claimed in claim 20 wherein the pyridinium salt is an N-(2-hydroxyethyl)-pyridinium salt.

22. A process as claimed in claim 20 wherein the pyridine nucleus of the N-hydroxyalkyl pyridinium salt has at least one inert substituent in the 2, 3, 5 or 6 position.

23. A process as claimed in any one of claims 20 wherein the N-hydroxyalkyl pyridinium salt is an N-hydroxyalkyl pyridinium chloride.

24. A process as claimed in claim 1 wherein the solvent contains up to 50% by volume of water.

25. A process as claimed in claim 1 wherein the alcohol contains up to 50% by volume of water.

References Cited

Kosower et al.: J. Am. Chem. Soc., vol. 86, pp. 5524–27 (1964).

Raphael et al.: Advances in Organic Chemistry, Methods and Results, vol. 5, Interscience Publishers, p. 2, 1965.

Winters et al.: Tetrahedron Letters, Pergamon Press, No. 24, pp. 2513–15 (1967).

Raphael et al.: Advances in Organic Chemistry, Methods and Results, vol. 5, pp. 6, 7 and 22; Interscience Publishers, 1965.

ALAN L. ROTMAN, Primary Examiner

U.S. Cl. X.R.

260—295 AM; 71—94

UNITED STATES PATENT OFFICE
CERTIFICATE OF CORRECTION

Patent No. 3,787,426                    Dated January 22, 1974

Inventor(s) JOHN EDWARD COLCHESTER ET AL.

It is certified that error appears in the above-identified patent and that said Letters Patent are hereby corrected as shown below:

Column 5, line 18, "1,1'-di(4-hydroxy-n-butyl)-"

should be --1,1'-di(6-hydroxy-n-hexyl)- --.

Column 6, line 10, "14" should be --12--.

Signed and Sealed this

Fourteenth Day of September 1976

[SEAL]

Attest:

RUTH C. MASON
Attesting Officer

C. MARSHALL DANN
Commissioner of Patents and Trademarks